Jan. 25, 1949.  W. H. ROBERTSON  2,459,965
TRAILER HITCH
Filed Jan. 16, 1948  2 Sheets-Sheet 1
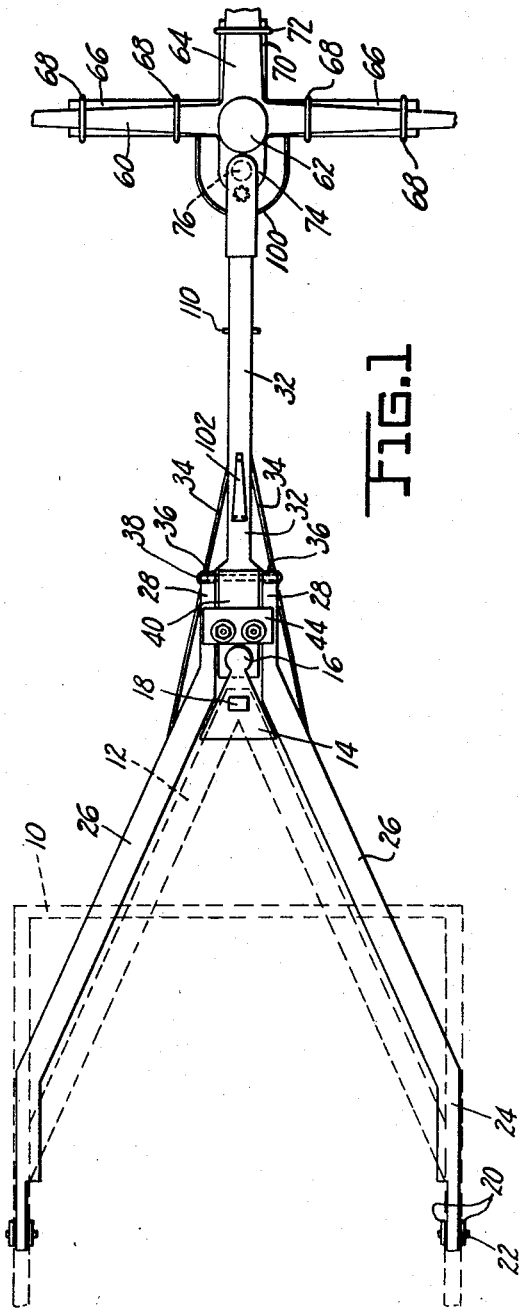
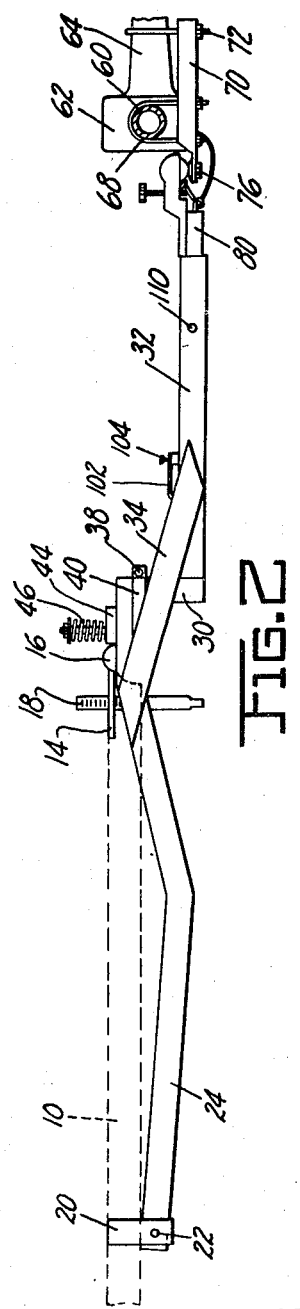
INVENTOR
WALTER H. ROBERTSON
BY
Oltsch & Knoblock
ATTORNEYS Jan. 25, 1949.  W. H. ROBERTSON  2,459,965
TRAILER HITCH Filed Jan. 16, 1948  2 Sheets—Sheet 2

INVENTOR
WALTER H. ROBERTSON
BY
Oltsch & Knoblock
ATTORNEYS

Patented Jan. 25, 1949

2,459,965

UNITED STATES PATENT OFFICE 2,459,965

TRAILER HITCH

Walter H. Robertson, Elkhart, Ind.

Application January 16, 1948, Serial No. 2,621

10 Claims. (Cl. 280—33.9)

This invention relates to improvements in trailer hitches, and more particularly to a hitch for attaching a house trailer or utility trailer to an automobile.

The primary object of the invention is to provide a device of this character which has a high safety factor, which is of sturdy construction and which is so designed that the trailer cannot become separated from the towing vehicle through the failure of any one component part.

A further object is to provide a device of this character which is positioned at a low level and is so designed that it greatly reduces the hazard of upsetting a trailer being towed at high speeds around curves, and also is so designed as to prevent whipping or jack-knifing of a trailer.

A further object is to provide a hitch of this character which is so designed that road shocks cannot be transmitted from the tractive vehicle to the trailer or from the trailer to the tractive vehicle.

A further object is to provide a hitch which is adapted to be connected to the running gear of an automobile rather than to a spring suspended part thereof, so that the springs of the automobile are free from the weight of the trailer and the automobile will ride with the same comfort when towing a trailer as when used as an independent unit insofar as springing of road shock is concerned.

A further object is to provide a hitch of this character which has a double safety feature, including a safety ring and hook and a slide bar arrangement having a primary interlock and a secondary safety interlock.

Other objects will be apparent from the following specification.

In the drawing:

Fig. 1 is a top plan view of the hitch with the trailer being illustrated in dotted lines at the left and parts of the driving shaft and axle mechanism of the automobile being shown at the right in said figure.

Fig. 2 is a view of the hitch in side elevation.

Figure 5:
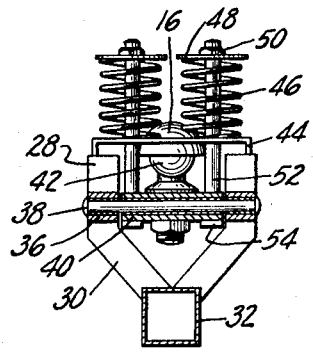
Fig. 5 is a vertical transverse sectional view taken on line 5—5 of Fig. 3.
Figure 6:
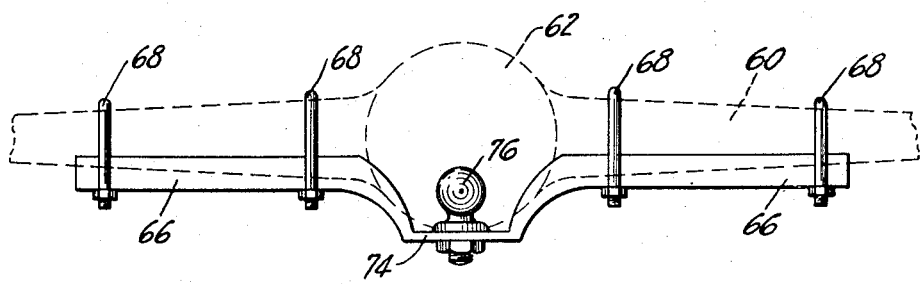
Fig. 6 is a side view of the bracket utilized to connect the hitch to the rear axle of an automobile.

Referring to the drawings which illustrate the preferred embodiment of the invention, the numeral 10 designates in dotted lines the body of a trailer which has projecting from the front thereof a frame member 12 which is preferably of triangular form and which terminates at its apex in a plate 14 having a downwardly facing socket 16. The plate 14 also serves to mount and support a jack bar 18 adapted to be adjusted vertically to hold the vehicle in any selected position with the hitch parts clear of the ground when the hitch is disconnected. This construction is standard and conventional in trailer design. In rearward spaced relation to the front end of the trailer 10 a pair of brackets or bracket sets 20 are rigidly secured to the trailer frame and depend therefrom for pivotal connection at 22 of elongated rigid arms 24. The pivots 22 extend transversely of the trailer body in alignment with each other and equally spaced from the longitudinal center of the trailer. The rear portions of the arms 24 extend forwardly and longitudinally of the trailer and then converge inwardly at portions 26 thereof located at opposite sides of the projecting frame part 12 of the trailer. The forward ends of the arms 24, 26 terminate in parallel spaced longitudinal portions 28. The arm units 24, 26, 28 are also preferably bent in a vertical plane, as best illustrated in Fig. 2, so that the portion thereof between the pivot axis and the front margin of the trailer body is normally inclined downwardly slightly, and the remaining portion forwardly of the trailer body to the parallel front portions 28 is inclined upwardly. This vertical bend permits pivoting of the arm relative to the trailer frame within predetermined limits for purposes to be mentioned hereinafter. A pair of upright frame members 30 is welded or otherwise fixedly secured at the front ends of the members 28 and, as illustrated in Fig. 5, converge downwardly and are connected to each other and to a longitudinal forwardly projecting elongated tubular member 32. A pair of rigid plates form braces 34 reinforcing the construction of the parts, said plates being welded at one end to the converging intermediate portions 26 of the hitch bars, and at their forward ends to the tubular member 32, whereby the structure is strengthened and rigidified to provide the equivalent of a long Y-shaped tongue projecting forwardly from the vehicle body with its rear arms pivoted about the axis 22.

Figure 3:
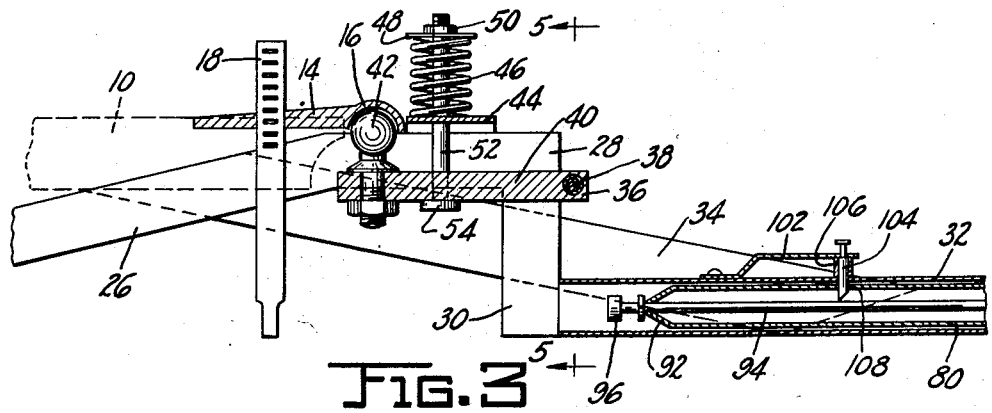
Fig. 3 is an enlarged side view of the device with parts shown in longitudinal vertical section.

Transverse collars or sleeves 36 are welded or otherwise fixedly secured to the vehicle end portions of the tongue members 28, 30 and mount the ends of cross-pin 38. A plate 40 is positioned between the arms 28 and is pivoted at its forward end upon the pin 38. The plate 40 at its rear end mounts a ball or knuckle 42 projecting upwardly above said plate and adapted to be received in the socket 16 on the trailer. As best seen in Fig. 3, the plate 40 is positioned below the level of the top of the tongue parts 28 so that space is provided for said ball joint member 42. The upper ends of the part 28 of the tongue structure support and are bridged by a rigid unit 44 upon which bear a pair of coil springs 46 whose upper ends support a plate 48 upon which bears a bolt 52, whose head 54 engages a nut 50. A bolt 52, whose head 54 engages the bottom surface of the plate 40, extends through each of the coil springs and is threaded into one of the nuts 50. It will be apparent that this construction serves to urge the plate 40 bearing the ball joint 42 upwardly relative to the tongue unit at all times, and further that it provides for relative movement of the trailer body and the Y-shaped tongue unit incident to road shock and travel.

The tractive vehicle as of an automobile, truck or other vehicle, will include a rear axle 60 connected by a differential 62 with a torque tube or other drive shaft structure 64. A rigid adaptor, including a pair of cross-arms 66 which are fixedly secured to the axle housing 60 by U-bolts 68, is held in fixed relation by a forward projection 70 underlying the main drive pinion housing 70 and anchored thereto by a U-bolt 72. The adapter is effectively held against movement in any direction and its platform 74 projecting rearwardly therefrom forms a firm seat and support for a ball or knuckle 76. It will be understood that the adapter comprising the parts 66, 70 and 74 will be reinforced and rigidified by flanges and cross-sectional shaping thereof to insure rigidity. An elongated rigid tubular member 80 of a cross-sectional dimension to fit snugly within the tubular longitudinal end portion 32 of the tongue mounts a socket at one end thereof. The socket preferably has a base portion 82 secured to the tube 80 and a part-spherical socket portion 84 adapted to bear upon the ball 76. A retainer 86 is pivoted within a groove 88 in the body of the socket and is adapted to be tilted between a locking position engaging the ball 76, as shown, and a ball releasing position, by means of a screw 90.

The outer end of the tube 80 is tapered at 92, as best seen in Fig. 3, and a rigid elongated rod 94 extends for the full length of the tube 80, projecting from the tapered end 92 and having a stop 96 thereon spaced from said tapered end. The opposite end of the rod 94 is bent in hook form at 98. This hook has a slide fit on a rigid U-member 100 secured to the anchor parts 66 and forming a safety member which permits full turning of the ball and socket joint.

Figure 4:
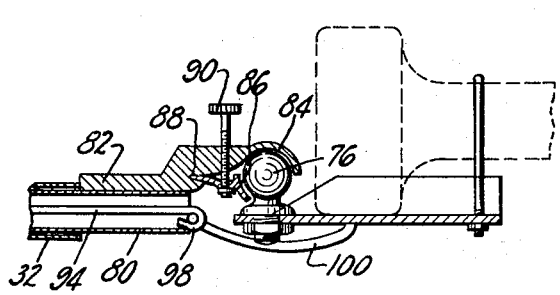
Fig. 4 is a longitudinal vertical section of a part of the hitch juxtaposed to the automobile.

The tubular end portion 32 of the Y-shaped tongue on the trailer mounts a longitudinal leaf spring 102 on whose end is secured a cross-pin 104 slidable in a collar 106 and registering with an opening in the tubular portion 32 at a point spaced inwardly from the end of the tubular portion 80 when the end of the tube portion 32 bears against the plate 82 of the socket mounted upon the tube 80, as shown in Fig. 4. The tube 80 has an opening therein adapted to receive the pin 104. The pin 104 has a tapered end portion, as illustrated in Fig. 3, at its rear lower face which makes possible the outward displacement of said pin by the tapered end portion 92 of the tube 80 when the tube 80 is inserted in the tube 32.

The parts of the device which form the Y-shaped tongue, including the tubular end member 32, all form a part of the unit attached to the trailer. The remaining parts of the device are normally attached to the towing tractive vehicle. It will be observed that the tube 80 projects rearwardly from the rear axle but is of comparatively short length. In actual practice the rear end of the tube 80 usually terminates adjacent to the rear bumper of the automobile, and when the hitch is disconnected, a bracket carried by the rear bumper or any other suspension means may serve to hold the rear free end of the tube in elevated position.

When it is desired to couple the hitch, the tractive vehicle and the trailer are moved relative to each other to slide the tube 80 into the tube 32 until the pin 104 seats in the aperture 108 in the tube 80, thereby locking the parts effectively. If desired, a second cross-pin 110 may be used to interconnect the telescopic parts of the hitch. For disconnection of the parts, all that is necessary is to grasp the spring 102 for the purpose of withdrawing the pin 104 from the tube 80 and then sliding the tubular parts to disconnect them, it being assumed that if the pin 110 is used it has previously been withdrawn.

It will be observed that two ball and socket joints are provided in this hitch. The joint comprising a ball 76 and the socket 84 provides a full universal movement desirable in a hitch for both turning and twisting components of relative movement. The second joint comprising socket 16 and the ball 42 primarily serves to accommodate vertical play of the trailer frame relative to the Y-shaped tongue, although in the event any movement other than such a locking movement must be absorbed, this second ball and socket joint will serve that purpose as well. The spring mount for the ball 42 of the second ball and socket joint is distinctly novel and increases the riding ease of a house trailer by cushioning road shock which normally would be transmitted to the trailer through the hitch.

It will be observed that a further advantage of this device is the use of the Y-shaped tongue and the telescopic interfitting of the parts to connect the hitch to insure against jack-knifing or whipping of the trailer.

While the preferred embodiment of the invention has been illustrated and described herein, it will be understood that changes in the construction thereof may be made within the scope of the appended claims without departing from the spirit of the invention.

I claim:

1. The combination with a tractive vehicle having an axle housing and a drive shaft housing, and a trailer adapted to be towed by said tractive vehicle and including a front projection mounting a joint socket, of a rigid adapter fixedly carried by said axle housing and drive shaft housing and including a projecting portion mounting a joint knuckle, a rigid elongated member mounting a socket at one end receiving said joint knuckle, a rigid elongated tongue connected to said trailer rearwardly of said projection and mounting a joint knuckle intermediate its ends fitting in said joint socket, said tongue terminating in a front tubular portion adapted for snug telescopic fit of said elongated member therein, and releasable means for anchoring said telescopically interfitting members against relative movement.

2. The combination defined in claim 1, wherein said rigid tongue is Y-shaped with its diverging arms spanning said front projection and pivoted about aligned transverse axes to said trailer.

3. The combination defined in claim 1, wherein the joint knuckle mounted on said tongue is resiliently supported for limited vertical play.

4. The combination defined in claim 1, wherein said rigid elongated member is tubular and has a tapered end, and a headed rod extends longitudinally thereof with its headed end projecting from the tapered end of the tubular member.

5. The combination defined in claim 1, wherein said releasable anchoring means constitutes a rigid pin adapted to seat in registering apertures in said interfitting members and mounted on the end of an elongated leaf spring carried by the tubular portion of said tongue.

6. A hitch adapted to connect a trailer with a tractor, comprising a pair of elongated rigid units, a rigid adapter for fixed connection with said tractor, a swivel joint connecting one unit with said adapter, the other unit being pivoted at its rear end to the trailer, yielding means connecting an intermediate portion of the other unit with the trailer, said units including elongated portions adapted to interfit snugly, and a latch for interlocking said interfitting parts.

7. The construction defined in claim 6, wherein the unit pivoted to the trailer is Y-shaped with its diverging arms connected to the trailer adjacent to its sides and with said yielding means positioned at the junction of said diverging arms.

8. The construction defined in claim 6, wherein said yielding means comprises a joint part pivoted to the trailer mounted unit about a transverse axis and cooperating with a joint part carried by said trailer, and spring pressed means for suspending said pivoted joint part from its mounting unit.

9. A hitch adapted to connect a trailer and a tractor, comprising a rigid Y-shaped tongue member adapted to be pivotally connected to said trailer at the ends of its diverging arms, a yielding support carried by an intermediate portion of said tongue member, a joint member carried by said support and adapted to cooperate with a joint member on the front of said trailer, said tongue member terminating in an elongated rigid tubular portion, an elongated member adapted for snug interfitting engagement with said tongue terminal portion, an anchor member adapted to be secured fixedly to said tractor, a universal joint connecting said elongated member and anchor member, and a latch for said interfitting parts.

10. A hitch of the construction defined in claim 9, wherein the tubular terminal portion of said tongue member is off-set vertically therefrom, and said yielding support includes a member pivoted to said tongue at said off-set and a resilient unit for suspending the free end of said pivoted member.

WALTER H. ROBERTSON.

No references cited.